United States Patent
Profit

[19]

[11] Patent Number: 5,967,720
[45] Date of Patent: Oct. 19, 1999

[54] INTERLOCKING FLATBED TRAILER LOAD STRAP FASTENING SYSTEM

[76] Inventor: Grant Profit, 2 West Spicer Place, Cochrane, Alberta, Canada, T0L 0W4

[21] Appl. No.: 09/224,423

[22] Filed: Dec. 31, 1998

[51] Int. Cl.[6] .................................................... B60P 7/08
[52] U.S. Cl. ........................... 410/116; 410/97; 410/101; 410/106
[58] Field of Search .............................. 410/116, 97, 101, 410/106; 24/68 CD, 265 CD, 698.1, 265 H; 248/499

[56] References Cited

U.S. PATENT DOCUMENTS

| | | |
|---|---|---|
| 564,255 | 7/1896 | Rappold . |
| 740,813 | 10/1903 | Croom et al. . |
| 1,055,067 | 3/1913 | Molloy . |
| 1,405,516 | 2/1922 | Humphreys . |
| 1,718,291 | 4/1929 | Guenther . |
| 2,189,574 | 2/1940 | Anderson . |
| 2,224,773 | 12/1940 | Shaulson . |
| 2,285,714 | 6/1942 | Hirsh . |
| 2,529,453 | 11/1950 | Johnson et al. . |
| 3,050,806 | 8/1962 | Cohn . |
| 3,162,919 | 12/1964 | Shee . |
| 3,327,361 | 6/1967 | Mathison . |
| 3,936,914 | 2/1976 | Mancini . |
| 5,139,375 | 8/1992 | Franchuk ................. 410/105 |
| 5,388,938 | 2/1995 | Helton ..................... 410/101 |
| 5,416,956 | 5/1995 | Rubin ..................... 24/601.4 |
| 5,443,341 | 8/1995 | Hamilton . |
| 5,458,447 | 10/1995 | Clason ..................... 410/100 |
| 5,553,981 | 9/1996 | Braden .................... 410/116 |
| 5,697,741 | 12/1997 | Harris et al. ............ 410/116 |
| 5,807,045 | 9/1998 | Profit ....................... 410/116 |
| 5,836,060 | 11/1998 | Profit ...................... 24/698.2 |

FOREIGN PATENT DOCUMENTS 1170404  1/1959  France .

OTHER PUBLICATIONS

Advertisement on "Tarpaulin & Tie downs" 1 page, no date.
Advertisement Lift All Company, Inc, 1 page, no date.

*Primary Examiner*—Stephen T. Gordon
*Attorney, Agent, or Firm*—David S. Thompson

[57] ABSTRACT

A fastening system 10 provides a fixed fastener 60 which may be removably interlocked with a strap fastener 20. The fixed fastener 60 is typically carried by a vertically oriented planar portion of a flatbed trailer, such as a section of the vehicle's frame. The fixed fastener 60 provides a base 61 and a hook 63, having ear and nose portions 67, 68. The strap fastener 20 is typically carried by the end of a strap 101 used to secure a load carried on the flatbed trailer. The strap fastener 20 defines a fastener opening 36 having left and right ear passages 38, 40, sized to allow passage of the fixed fastener 60 when the strap fastener is rotated so that the ear portion 68 of the fixed fastener 60 passes through one of the ear passages of the strap fastener. Such passage is almost impossible to result accidentally; therefore the fasteners will remain connected during use, and must be deliberately disconnected.

1 Claim, 3 Drawing Sheets

INTERLOCKING FLATBED TRAILER LOAD STRAP FASTENING SYSTEM

CROSS-REFERENCES

There are no applications related to this application filed in this or any foreign country.

BACKGROUND

In the trucking industry, loads are secured to flatbed trailers by straps having fasteners of different types which are used to secure the strap to the base of the trailer. Such fasteners must allow easy and rapid attachment and removal, but must resist the tendency release during travel due to vibration or shifts in the load.

A common type of fastener employs a hook element which is lowered below a flat iron bar carried on the side of the flatbed trailer. The strap is then shortened, pulling the hook against the bar. However, if slack length should develop in the fastening strap, perhaps due to load settling, the hook may release from the bar during travel. A similar problem exists with a similar hook system that provides inverted hooks attached to the side of the trailer. When too much slack length develops in the fastening strap, the fastener may release the hook.

A related problem involves the use of such fasteners to latch on to the "rub rail" provided by some trucks as a sort of "side bumper". Such rails are not structurally designed to support load securing straps, but are instead designed to withstand the impact of minor collisions. Attachment of the fastening straps to the rub rail of the truck could result in damage to the rail, and could result in release of the strap, causing a shift or loss of the load.

What is needed it an interlocking flatbed trailer load strap fastening system that prevents unwanted release during travel. In particular, the load strap fastening system must not release when some extra slack length develops in the load straps.

SUMMARY

The present invention is directed to an apparatus that satisfies the above needs. A novel interlocking flatbed trailer load strap fastening system provides a fixed fastener carried by the side of the flatbed trailer and a strap fastener, carried by the end of a load strap, that is removably attachable to the fixed fastener.

The interlocking flatbed trailer load strap fastening system 10 of the present invention is adapted to releasably fasten a load-securing tie-down strap to a vehicle, and provides some or all of the following structures.

(A) A strap fastener 20, adapted to be carried by the end of a load-securing tie-down strap 101, having a body 22, defining a fastener opening 36 and a strap opening 34, the body including:
  (a) Generally parallel left and right side elements 24, 26.
  (b) An upper cross member 28, connecting the left and right side elements 24, 26.
  (c) A lower cross member 30, parallel to the upper cross member 28, connecting the left and right side element 24, 26.
  (d) A curved base 32, having left and right ends attached to the left and right side elements, respectively, wherein the curved base is separated from the lower cross member by a first distance 42.
  (e) Left and right ear passages 38, 40, defined at the intersection of the lower cross member and the left and right side elements, respectively, wherein the curved base is separated from the ear passages by a second distance 44.

(B) A fixed fastener 60, adapted to be carried by the vehicle and adapted to be removably attached to the strap fastener 20, the fixed fastener including:
  (1) A base 61, typically made of steel plate, suitable for attachment to a flatbed trailer.
  (2) A hook portion 63, typically made of steel plate and oriented perpendicularly to the base, suitable for attachment to the strap fastener 20, the hook portion having:
    (a) A shoulder portion 64, extending perpendicularly from the base.
    (b) A neck portion 65, connected to the shoulder portion, extending further from the base, wherein the neck has a bottom edge 69 that is in contact with the curved base when the strap fastener 20 is attached to the fixed fastener 60.
    (c) A head portion 66, having opposed ear 67 and nose 68 ends separated by a third distance labeled 70 in FIG. 3, wherein the distance 70 is less than the second distance 44, allowing the strap fastener to be inserted over the head when the strap fastener is rotated. However, the third distance 70 is greater than the first distance 42, making it impossible to remove the strap fastener without rotating it.

It is therefore a primary advantage of the present invention to provide a novel interlocking flatbed trailer load strap fastening system that will not release during travel, even where the load strap becomes somewhat slack.

Another advantage of the present invention is to provide a novel interlocking flatbed trailer load strap fastening system that is easily fastened and unfastened by intentional movements, but is very unlikely to unfasten due to random movement.

DRAWINGS

These and other features, aspects, and advantages of the present invention will become better understood with regard to the following description, appended claims, and accompanying drawings where:

DESCRIPTION

Figure 1:
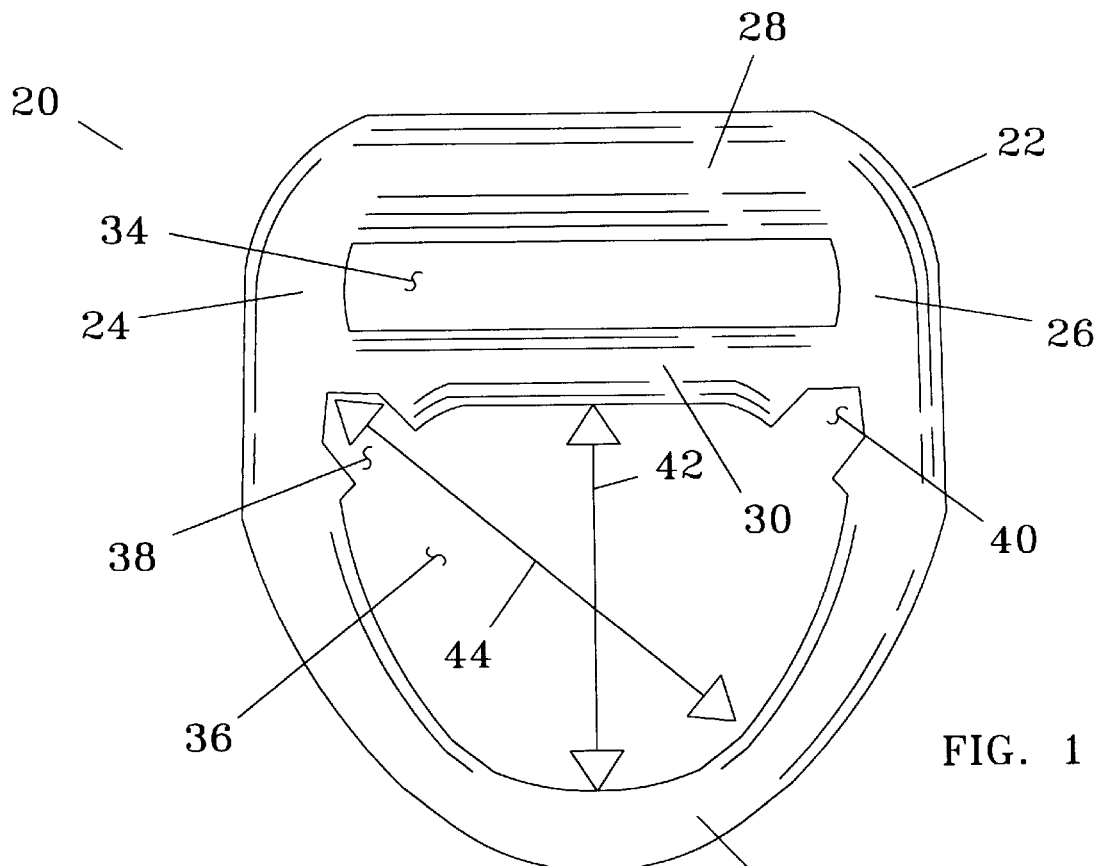
FIG. 1 is a somewhat enlarged front orthographic view of a version of the strap fastener portion of the invention.
Figure 2:
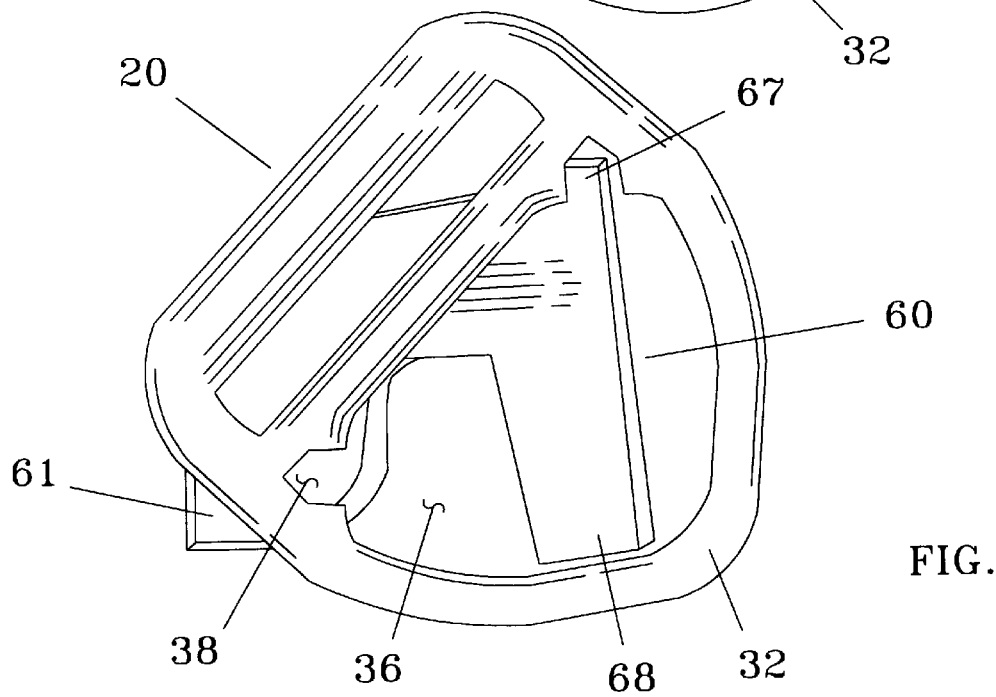
FIG. 2 is a perspective view of the fixed fastener and the strap fastener during the process of connection or removal of the strap fastener.
Figure 3:
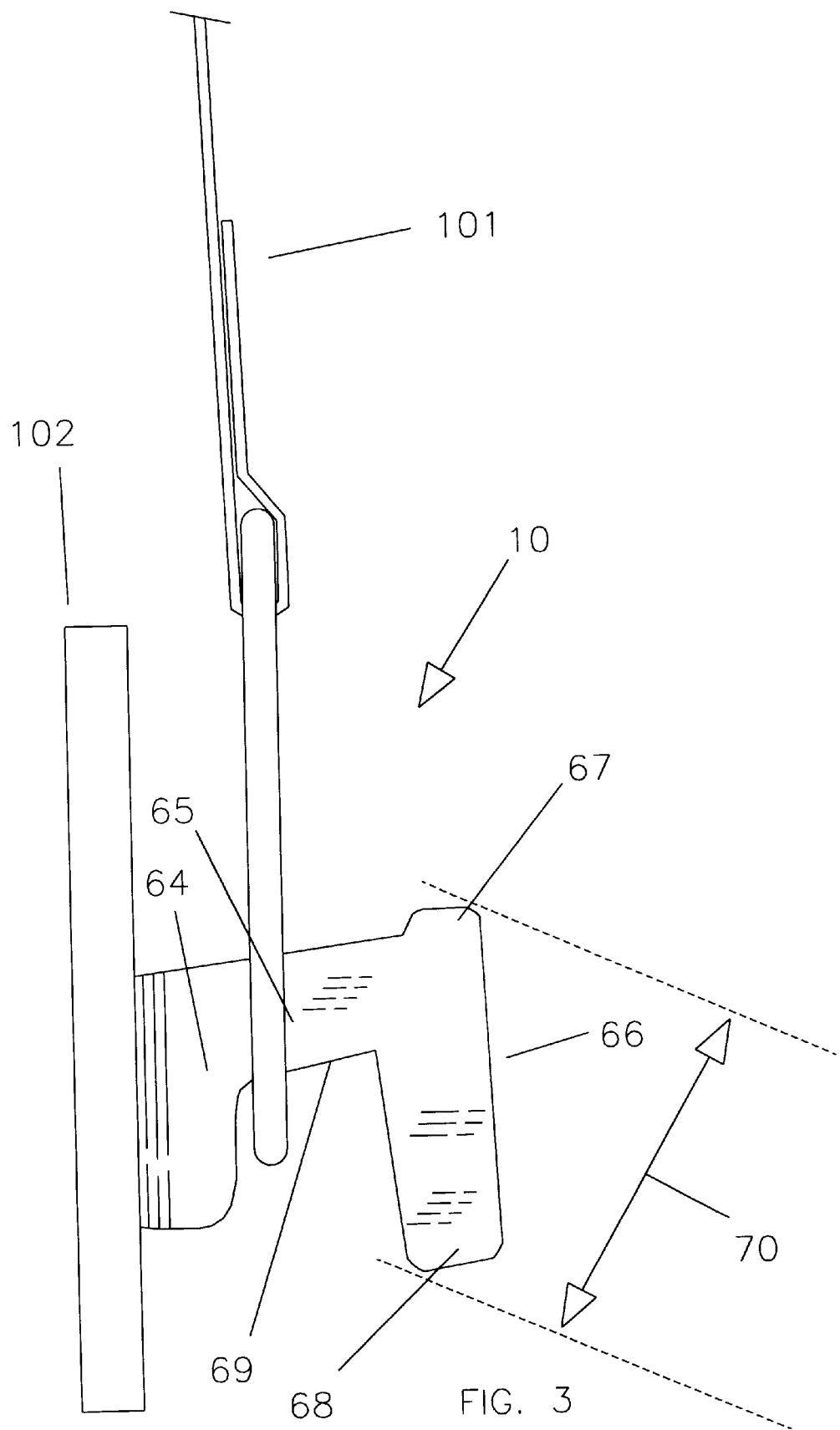
FIG. 3 is a side orthographic view of the strap fastener of FIG. 1, attached to a version of the fixed fastener of the invention.
Figure 4:
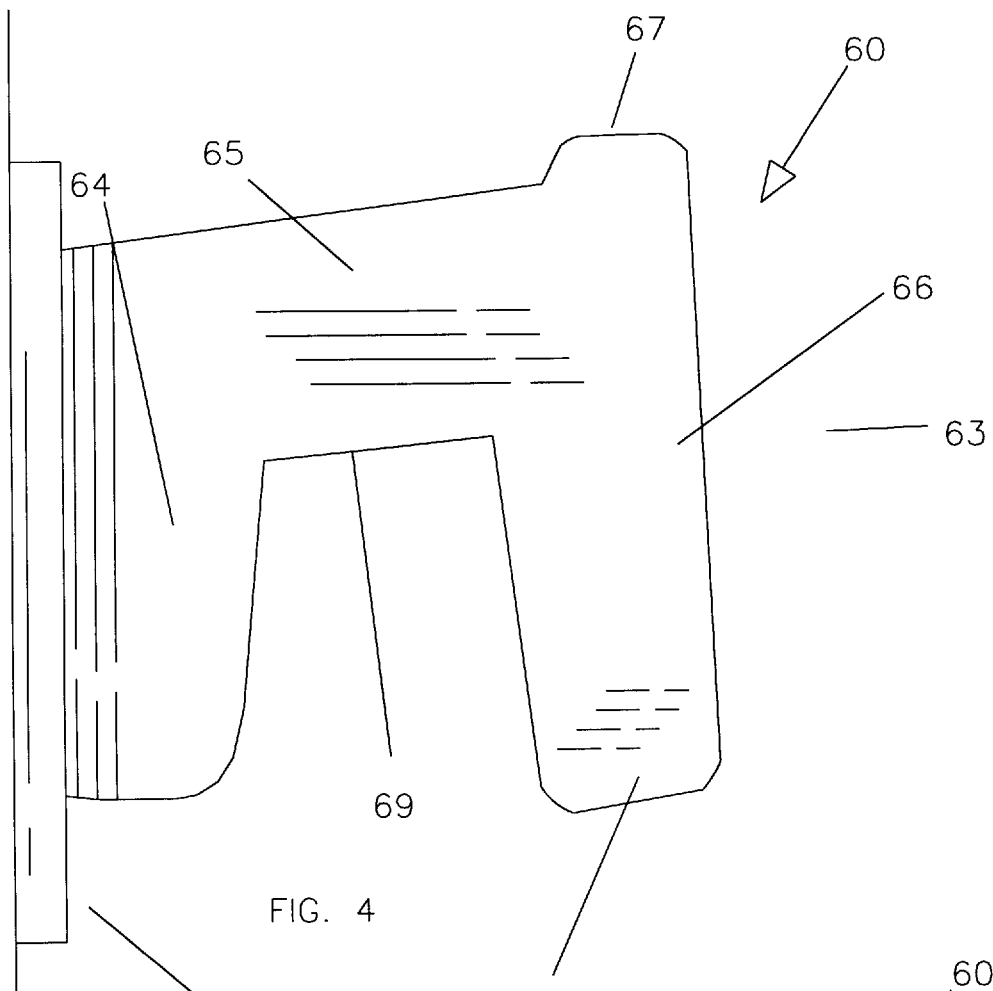
FIG. 4 is a side orthographic view of the fixed fastener of FIG. 3 having a base attached to a vehicle.
Figure 5:
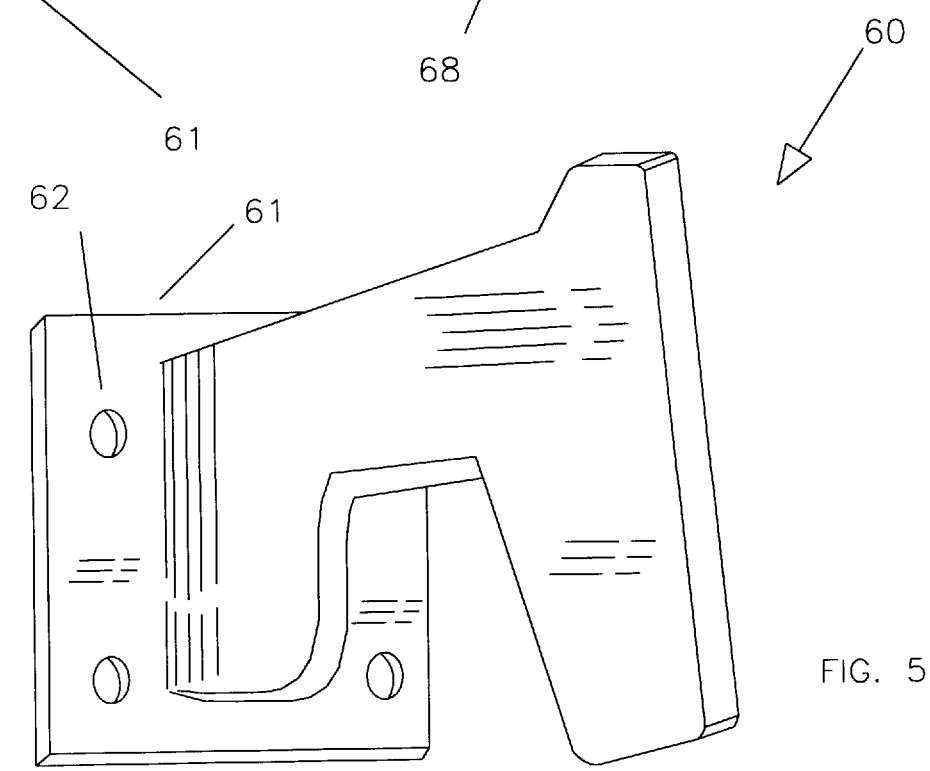
FIG. 5 is a perspective view of the fixed fastener of FIG. 4.

A preferred embodiment of the fastening system 10 provides a fixed fastener 60 which may be removably interlocked with a strap fastener 20. The fixed fastener 60, as seen in FIGS. 3–5, is typically carried by a vertically oriented planar portion of a flatbed trailer, such as a section of the vehicle's frame. The fixed fastener 60 provides a base 61 and a hook portion 63, having ear and nose portions 67, 68. The strap fastener 20, as seen in FIGS. 1–3 is typically carried by the end of a strap 101 used to secure a load carried on the flatbed trailer. The strap fastener 20 defines a fastener opening 36 having left and right ear passages 38, 40, sized to allow passage of the fixed fastener 60 when the strap fastener is rotated so that the ear portion 68 of the fixed fastener 60 passes through one of the ear passages of the strap fastener. Such passage is almost impossible to result accidentally; therefore the fasteners will remain connected during use, and must be deliberately disconnected.

Referring particularly to FIG. 1, a preferred version of the strap fastener 20 includes a body 22 and two openings 34, 36 defined within the body. The preferred body is made of solid steel rod having a rounded exterior and an approximately ⅝ inch diameter. The body includes left and right side elements 24, 26, connected by an upper cross member 28 having a similar diameter. A curved base 32 connects the left and right side elements. A lower cross member 30 is typically of smaller diameter, and connects the left and right side elements.

A strap opening 34 is defined between the left and right side elements 24, 26, and the upper and lower cross members 28, 30. As seen in FIG. 3, the strap opening allows connection of a load-securing tie-down strap 101. Typically, one end of the strap 101 is passed through the opening 34, folded back against the itself and sewn together.

As seen in FIG. 1, a fastening opening 36 is defined in the body 22 between the curved base 32 and the lower cross member 30. The shape of the fastener opening is an important aspect of the invention. The fastening opening is sized to allow passage over the fixed fastener 60 when properly rotated, but to prevent accidental separation of the fixed fastener and strap fastener.

A key element in the shape of the fastener opening is the presence of left and right ear passages 38, 40, which allow passage of the ear portion 67 of the fixed fastener 60. Without the ear passages, the distance across the fastener opening 36 is a first distance labeled 42, which is less than the distance 70 from the nose 68 to the ear 67 of the head 66 of the fixed fastener 60.

However, using either ear passage 38 or 40, the distance across the fastener opening is a second distance labeled 44, which is greater than the third distance 70. Therefore, either ear passage 38 or 40 may be used to provide the extra length required to allow passage of the head 66 of the fixed fastener 60 through the fastener opening 36.

As seen in FIGS. 3–5, the fixed fastener 60 provides a base 61, typically having one or more fastening holes 62 for attachment to the vehicle frame 102. In the preferred embodiment, the base is made of 0.25" thick steel plate, 2.5" wide and 3" tall. The base is suitable for attachment to the vehicle frame 102 or side of a flatbed trailer, typically by either welding, bolts, screws or other fastening means.

A hook portion 63 is formed from steel plate that is 0.25" thick, and is sized and dimensioned carefully to allow releasable attachment to the strap fastener 20. The hook portion provides a shoulder portion 64 that is approximately 2" to 4" tall (parallel to the vertical long side of the base) and 1" deep (perpendicular to the surface of the base). A neck area 65 extends outwardly from the shoulder portion approximately 1", and is 1.25" tall. A head portion 66 is approximately 3 ⅜" long, from ear 67 to nose 68, and is attached to the neck area.

Significantly, the third distance labeled 70 in FIG. 3, from the ear 67 to the nose 68 is short enough to pass through the fastener opening 36, which is defined by the left and right side elements 24, 26 and on the top by the lower cross member 30 and the bottom by the curved base 32. This is possible, however, only when the strap fastener is turned at approximately 45 degrees to the head 66, so that the ear 67 passes through either of the ear passages 38, 40, and the nose 68 is adjacent to the curved base 32.

Also significantly, the distance from the ear 67 to the nose 68 is greater than the first distance labeled 42 in FIG. 1 between the lower cross member 30 and the curved base 32. As a result, the hook portion 63 will not release the strap fastener 20 unless the strap fastener is rotated.

The above dimensions are relative, in that the strap fastener 20 and the fixed fastener 60 should have dimensions that are appropriately related; i.e. a larger or smaller fixed fastener would result in a larger or smaller strap fastener that would be appropriately sized.

To use the interlocking truck load strap fastening system 10, the load-securing strap 101 is installed on the strap fastener 20, as seen in FIGS. 3. The fixed fastener 60 is fastened to the side of a flatbed trailer, typically to the vehicle's frame 102. The fixed fastener is oriented in the manner seen in FIG. 5.

A strap 101 is attached to the upper cross member 28 of the strap fastener 20, as seen in FIG. 3.

The strap 101 is then positioned over the load carried by the trailer. The strap fastener is then connected to the fixed fastener. By rotation of the strap fastener, the ear 67 of the fixed fastener 60 is inserted through either ear passage 38, 40, allowing the head 66 of the fixed fastener to pass through the fastener opening 36.

The strap fastener may be removed by reversing the above steps. Since the sequence of movements required to fasten or release the strap fastener is somewhat complex, accidental separation is unlikely.

It is therefore a primary advantage of the present invention to provide a novel interlocking flatbed trailer load strap fastening system that will not release during travel, even where the load strap becomes somewhat slack.

Another advantage of the present invention is to provide a novel interlocking flatbed trailer load strap fastening system that is easily fastened and unfastened by intentional movements, but is very unlikely to unfasten due to random movement.

In compliance with the U.S. Patent Laws, the invention has been described in language more or less specific as to methodical features. The invention is not, however, limited to the specific features described, since the means herein disclosed comprise preferred forms of putting the invention into effect. The dimensions given for the various components are to be considered only to be those of a preferred version of the invention, and it is understood that other similar dimensions would also be suitable. In particular, the relative dimensions of the various components are of greater importance than the absolute dimensions of any component or component part. The invention is, therefore, claimed in any of its forms or modifications within the proper scope of the appended claims appropriately interpreted in accordance with the doctrine of equivalents.

What is claimed is:

1. An interlocking truck load strap fastening system, adapted to releasably fasten a load-securing tie-down strap to a vehicle, the fastening system comprising:

(A) a strap fastener, adapted to be carried by the end of the load-securing tie-down strap, having a body defining a fastener opening and a strap opening, the body comprising:
  (a) generally parallel left and right side elements;
  (b) an upper cross member connecting the left and right side elements;
  (c) lower cross member, parallel to the upper cross member, connecting the left and right side elements;
  (d) a curved base, having left and right ends attached to the left and right side elements, respectively, wherein the curved base is separated from the lower cross member by a first distance; and
  (e) left and right ear passages, defined at the intersection of the lower cross member and the left and right side elements, respectively, wherein the curved base is separated from the ear passages by a second distance;
(B) a fixed fastener, adapted to be carried by a frame of a vehicle and adapted to be removably attached to the strap fastener, the fixed fastener comprising:
  (1) a base, adapted for attachment to the vehicle; and
  (2) a hook portion extending from the fixed fastener base, the hook portion adapted for attachment to the strap fastener, the hook portion comprising:
    (a) a shoulder portion, extending perpendicularly from the fixed fastener base;
    (b) a neck portion, connected to the shoulder portion, wherein the neck has a bottom edge that is in contact with the curved base when the strap fastener is attached to the fixed fastener; and
    (c) a head portion, having opposed ear and nose ends, wherein the ear and nose ends are separated by a third distance, and wherein the third distance is less than the second distance, allowing the strap fastener to be inserted over the head portion when the strap fastener is rotated to an orientation wherein one of the ear passages is adjacent to the ear end, but greater than the first distance, thereby making it impossible to remove the strap fastener without rotating it.

* * * * *